(12) United States Patent
Al-Shyoukh et al.

(10) Patent No.: US 11,029,714 B2
(45) Date of Patent: *Jun. 8, 2021

(54) FLIPPED GATE CURRENT REFERENCE AND METHOD OF USING

(71) Applicant: TAIWAN SEMICONDUCTOR MANUFACTURING COMPANY, LTD., Hsinchu (TW)

(72) Inventors: Mohammad Al-Shyoukh, Cedar Park, TX (US); Alexander Kalnitsky, San Francisco, CA (US)

(73) Assignee: TAIWAN SEMICONDUCTOR MANUFACTURING COMPANY, LTD., Hsinchu (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/870,382

(22) Filed: May 8, 2020

(65) Prior Publication Data

US 2020/0272180 A1 Aug. 27, 2020

Related U.S. Application Data

(63) Continuation of application No. 15/450,912, filed on Mar. 6, 2017, now Pat. No. 10,649,476, which is a
(Continued)

(51) Int. Cl.
*G05F 3/24* (2006.01)
*G05F 3/20* (2006.01)
(Continued)

(52) U.S. Cl.
CPC ............... *G05F 1/46* (2013.01); *G05F 3/242* (2013.01); *H02M 3/158* (2013.01)

(58) Field of Classification Search
CPC ... G05F 3/262; G05F 3/24; G05F 3/20; G05F 3/205
See application file for complete search history.

(56) References Cited

U.S. PATENT DOCUMENTS 5,774,013 A 6/1998 Groe
6,107,868 A 8/2000 Diniz
(Continued)

FOREIGN PATENT DOCUMENTS

JP 2005-311546 11/2005
KR 20130047658 5/2013
(Continued)

OTHER PUBLICATIONS

Office Action dated Jul. 4, 2016 from corresponding No. TW 104122260.
(Continued)

*Primary Examiner* — Thienvu V Tran
*Assistant Examiner* — Sisay G Tiku
(74) *Attorney, Agent, or Firm* — Hauptman Ham, LLP (57) ABSTRACT

A tracking voltage generator, the latter including: a first transistor having a first leakage current and which is coupled with the flipped gate transistor so that a difference between a gate-source voltage (Vgs) of a flipped gate transistor and the first transistor is approximately equal to a bandgap voltage of a semiconductor material from which the tracking voltage generator is formed; an output node providing a tracking voltage which has a positive or negative temperature dependency based on the flipped gate transistor and the first transistor; and a second transistor connected to the output node and which has a second leakage current. A current reference includes: the tracking voltage generator; an amplifier to receive the tracking voltage and output an amplified signal; a control transistor to receive the amplified signal and conduct a reference current therethrough; and a control resistor connected in series with the control transistor.

20 Claims, 8 Drawing Sheets

Related U.S. Application Data continuation of application No. 14/518,638, filed on Oct. 20, 2014, now Pat. No. 9,590,504.

(60) Provisional application No. 62/057,567, filed on Sep. 30, 2014.

(51) Int. Cl.
  G05F 1/46 (2006.01)
  H02M 3/158 (2006.01)

(56) References Cited

U.S. PATENT DOCUMENTS

| | | | |
|---|---|---|---|
| 6,466,081 B1 | 10/2002 | Eker | |
| 6,963,188 B2 | 11/2005 | Wich | |
| 7,323,857 B2 | 1/2008 | Sung | |
| 7,667,533 B1 | 2/2010 | Tan | |
| 8,368,789 B2 | 2/2013 | Xu | |
| 9,785,177 B1 | 10/2017 | Coimbra | |
| 10,345,846 B1* | 7/2019 | Bartling | G05F 3/247 |
| 10,585,447 B1* | 3/2020 | Tanimoto | G05F 3/262 |
| 2002/0014883 A1 | 2/2002 | Sirito-Olivier | |
| 2003/0098735 A1 | 5/2003 | Jaussi | |
| 2003/0227322 A1 | 12/2003 | Ozoe | |
| 2005/0218872 A1 | 10/2005 | Wich | |
| 2005/0218968 A1 | 10/2005 | Watanabe | |
| 2006/0104122 A1* | 5/2006 | Choy | G11C 16/0416 365/185.29 |
| 2006/0255787 A1 | 11/2006 | Schaffer | |
| 2007/0182400 A1 | 8/2007 | Finney | |
| 2008/0233694 A1 | 9/2008 | Li | |
| 2011/0248171 A1* | 10/2011 | Rueger | G01S 11/12 250/340 |
| 2012/0007659 A1 | 1/2012 | Cusinato | |
| 2012/0293212 A1 | 11/2012 | Hanson | |
| 2012/0312880 A1* | 12/2012 | Ochoa | G06K 19/0715 235/492 |
| 2012/0313592 A1* | 12/2012 | Ochoa | G05F 1/613 323/223 |
| 2012/0313603 A1* | 12/2012 | Ochoa | G06K 19/0709 323/282 |
| 2012/0313665 A1* | 12/2012 | Ochoa | G06K 19/0715 326/104 |
| 2012/0313698 A1* | 12/2012 | Ochoa | G06K 19/0715 329/347 |
| 2013/0057351 A1 | 3/2013 | Moronvalle | |
| 2013/0063103 A1 | 3/2013 | Samid | |
| 2013/0106394 A1 | 5/2013 | Kobayashi | |
| 2013/0141151 A1* | 6/2013 | Ochoa | H03H 19/004 327/284 |
| 2014/0118034 A1 | 5/2014 | Lemkin | |
| 2015/0035550 A1* | 2/2015 | Chinnakonda Kubendran | G01K 7/01 324/686 |
| 2015/0160680 A1 | 6/2015 | Marinca | |
| 2015/0214903 A1 | 7/2015 | Zhang | |
| 2015/0214934 A1* | 7/2015 | Luan | H03K 3/011 331/111 |
| 2015/0234412 A1 | 8/2015 | Al-Shyoukh | |
| 2015/0234413 A1* | 8/2015 | Al-Shyoukh | G05F 3/24 323/313 |
| 2015/0303254 A1 | 10/2015 | Tschumakow | |
| 2016/0224040 A1 | 8/2016 | Peluso | |
| 2019/0044478 A1 | 2/2019 | Kobayashi | |

FOREIGN PATENT DOCUMENTS

| | | |
|---|---|---|
| TW | 201023342 | 6/2010 |
| TW | 201135397 | 10/2011 |
| TW | 201135398 | 10/2011 |
| TW | 201140277 | 11/2011 |

OTHER PUBLICATIONS

Henri J. Oguey, et al., "MOS Voltage Reference Based on Polysilicon Gate Work Function Difference", IEEE Journal of Solid-State Circuits, vol. SC-15, No. 3, Jun. 1980, pp. 264-269.

Office Action dated May 30, 2016 and English translation from corresponding No. KR 10-2014-0190949.

Notice of Allowance dated Dec. 27, 2016 and English translation from corresponding application No. KR 10-2014-0190949.

Henri Oguey "MOS voltage reference based on polysilicon gate work function difference," IEEE Journal of Solid-State Circuits, vol. 15, No. 3, pp. 264-269, Jun. 1980.

* cited by examiner

FLIPPED GATE CURRENT REFERENCE AND METHOD OF USING

PRIORITY CLAIM

The present application is a continuation of U.S. application Ser. No. 15/450,912, filed Mar. 6, 2017, and granted as U.S. Pat. No. 10,649,476, which is a continuation of U.S. application Ser. No. 14/518,638, filed Oct. 20, 2014, and granted as U.S. Pat. No. 9,590,504, which claims priority of U.S. Provisional Application No. 62/057,567, filed Sep. 30, 2014, the disclosures of which are incorporated herein by reference in their entireties.

RELATED APPLICATIONS

This application is related to U.S. application Ser. No. 14/182,810, filed Feb. 18, 2014, entitled FLIPPED GATE VOLTAGE REFERENCE AND METHOD OF USING, published as U.S. Pre-Grant Publication No. US2015/0234413; and to U.S. application Ser. No. 14/451,920, filed Aug. 5, 2014, entitled FLIPPED GATE VOLTAGE REFERENCE HAVING BOXING REGION AND METHOD OF USING, and granted as U.S. Pat. No. 10,241,535, both of which are herein incorporated by reference in their entireties.

BACKGROUND

A current reference is a circuit used to provide a reference current to a circuit. The circuit uses the reference current as a means of biasing various components within the circuit. For example, current references are used to provide an accurate bias for components such as oscillators, amplifiers, phase locked loops, or other suitable components.

In some approaches, the current reference is formed using bipolar junction transistors (BJTs) to form bandgap references to provide the reference voltage signal. In PNP BJTs the substrate acts as a collector for the BJT rendering the BJT sensitive to majority carrier noise in the substrate. In NPN BJTs the collector is formed as an n-well in a p-type substrate and is susceptible to picking up minority carrier noise from the substrate. Neither NPN BJTs or PNP BJTs allow full isolation from substrate noise.

In some approaches, a temperature independent resistor, such as a silicon chromium resistor, is used in combination with a voltage reference. In some approaches, a proportional to absolute temperature (PTAT) current source is used in combination with a complementary to absolute temperature (CTAT) current source to reduce temperature dependency of a generated current.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are examples and are not intended to be limiting.

Figure 1:
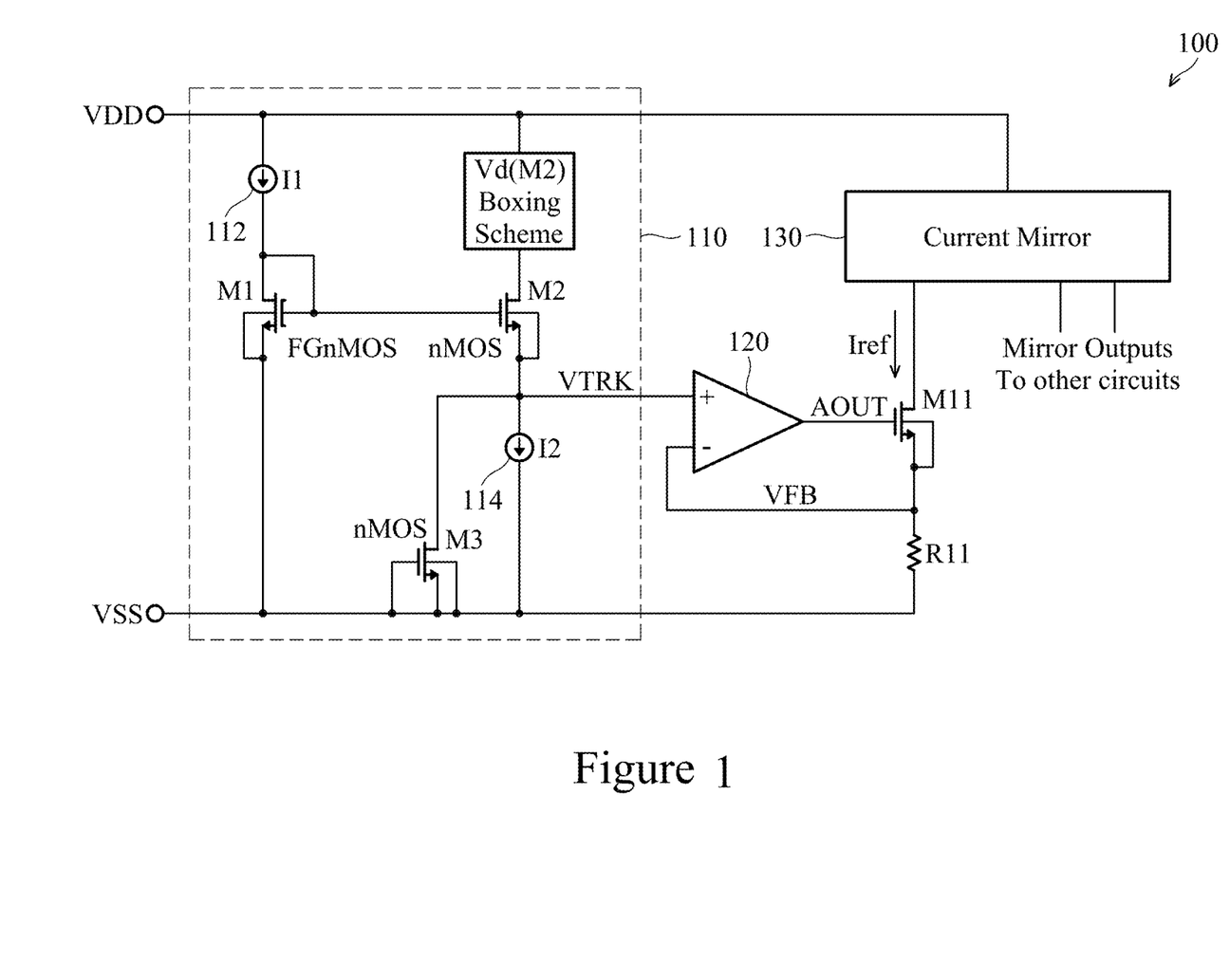
FIG. 1 is a schematic diagram of a current reference in accordance with some embodiments.

FIG. 1 is a schematic diagram of a current reference 100 in accordance with some embodiments. Current reference 100 includes a tracking voltage generator 110 configured to generate a tracking voltage $V_{TRK}$. Current reference 100 further includes an amplifier 120 configured to receive the tracking voltage $V_{TRK}$ at a first input of the amplifier. Amplifier 120 is further configured to selectively adjust a conductivity of a control transistor M11. A feedback loop is connected to a second input of amplifier 120. An output of amplifier 120 is connected to a gate of control transistor M11. A source of control transistor M11 is connected to a first end of a control resistor R11 in series. The feedback loop is connected to the source of control transistor M11 between the control transistor and control resistor R11. A second end of control resistor R11 is connected to a negative supply voltage VSS. Current reference 100 further includes a current mirror 130 connected to a drain of control transistor M11. Current mirror 130 is configured to mirror a current passing through control transistor M11 to external components.

Tracking voltage generator 110 is configured to generate a temperature dependent tracking voltage $V_{TRK}$. The temperature dependence of tracking voltage $V_{TRK}$ is substantially equal to a temperature dependence of a resistance of control resistor R11. As a resistance of control resistor R11 increases due to temperature variation, a voltage level of tracking voltage $V_{TRK}$ increases at substantially a same rate in order to maintain a substantially constant ratio $V_{TRK}/r11$, where r11 is the temperature dependent resistance of control resistor R11. Similarly, as the resistance of control resistor R11 decreases due to temperature variation, the voltage level of tracking voltage $V_{TRK}$ decreases to maintain the ratio $V_{TRK}/r11$ at a substantially constant value.

Tracking voltage generator 110 includes a flipped gate transistor M1 between an operating voltage VDD and negative supply voltage VSS. A first current source 112 is configured to supply a first current I1 across flipped gate transistor M1. A transistor M2 is connected between operating voltage VDD and negative supply voltage VSS. Transistor M2 is connected to flipped gate transistor M1 in a Vgs subtractive arrangement. A Vgs subtractive arrangement means that an output of tracking voltage generator 110 is equal to a Vgs voltage of flipped gate transistor M1 minus a Vgs voltage of transistor M2. The Vgs subtractive arrangement results from a gate of transistor M2 and flipped gate transistor M1 receiving a same voltage and a source terminal of the flipped gate transistor M1 connected to negative supply voltage VSS. A second current source 114 is configured to supply a second current I2 across transistor M2. A transistor M3 is connected between transistor M2 and negative supply voltage VSS. Each of a gate, a source terminal, and a bulk of transistor M3 are connected to negative supply voltage VSS. An output node for outputting tracking voltage $V_{TRK}$ is located between transistor M2 and negative supply voltage VSS and is connected to a drain terminal of transistor M3.

Flipped gate transistor M1 is used to help produce a temperature dependent tracking voltage $V_{TRK}$. Flipped gate transistor M1 includes a gate electrode which is anti-doped. Anti-doping is a process of doping the gate electrode with a dopant type which is the same as a substrate of flipped gate transistor M1. For example, in a conventional n-type metal oxide semiconductor (NMOS), the substrate is p-doped and the gate electrode is n-doped. However, in a flipped gate NMOS; a portion of the gate electrode is p-doped.

Figure 2:
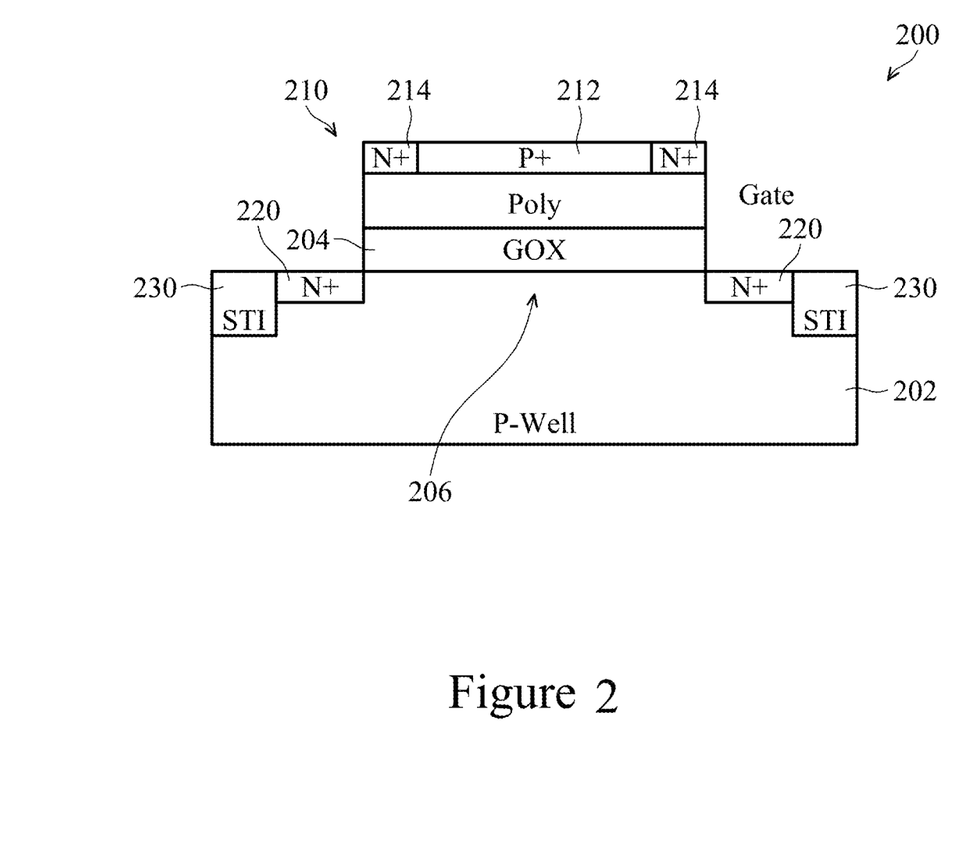
FIG. 2 is a cross sectional view of a flipped gate transistor in accordance with some embodiments.

FIG. 2 is a cross sectional view of a flipped gate transistor 200 in accordance with one or more embodiments. Flipped gate transistor 200 is an n-type flipped gate transistor. Flipped gate transistor 200 includes a substrate 202. A gate dielectric layer 204 is over a channel region 206 of substrate 202. A gate electrode 210 is over gate dielectric layer 204. A body region 212 of gate electrode 210 is doped with p-type dopants. Edges 214 of gate electrode 210 are n-doped for self aligned formation of n-doped source/drain (S/D) features 220. Isolation regions 230 are positioned between adjacent flipped gate transistors, in some embodiments. In some embodiments, gate electrode 210 includes doped polysilicon, a metal gate or another suitable gate material. In some embodiments, the p-type dopants include boron, boron di-fluoride, or other suitable p-type dopants. In some embodiments, the n-type dopants include arsenic, phosphorous, or other suitable n-type dopants.

Returning to FIG. 1, the gate of flipped gate transistor M1 is connected to a drain terminal of the flipped gate transistor. A bulk of flipped gate transistor M1 is connected to the source terminal of the flipped gate transistor. In some embodiments, flipped gate transistor M1 is substantially p-doped. Substantially p-doped means that a gate electrode of flipped gate transistor M1 is p-doped except at edges of the gate electrode. The edges of the gate electrode of flipped gate transistor M1 are n-typed to facilitate forming of the drain and source terminals of the flipped gate transistor.

First current source 112 is configured to supply the first current to flipped gate transistor M1. In some embodiments, first current source 112 includes at least one current mirror. In some embodiments, first current source 112 includes a startup device and a current generation device, an external current source, or another suitable current source.

Transistor M2 is used to help produce the temperature dependent tracking voltage $V_{TRK}$. Transistor M2 is not a flipped gate transistor. In some embodiments, transistor M2 is a standard NMOS transistor. The gate of transistor M2 is connected to the gate of flipped gate transistor M1. A drain terminal of transistor M2 is connected to operating voltage VDD. A bulk of transistor M2 is connected to the source terminal of the transistor.

Flipped gate transistor M1 has a first size defined by a width and a length of the flipped gate transistor. Transistor M2 has a second size defined by a width and a length of the transistor. The size of transistor M2 is greater than a size of flipped gate transistor M1. The size of transistor M2 is an integer multiple N of the size of flipped gate transistor M1. In some embodiments, the integer multiple N ranges from about 2 to about 50. In some embodiments, the size of a transistor is defined based on a number of fingers with each finger having a same width W and a same length L. For example, a transistor having two fingers having width W and length L has a size two times greater than a transistor having one finger having width W and length L. A size difference between transistor M2 and flipped gate transistor M1 helps determine a temperature dependence of tracking voltage $V_{TRK}$. In some embodiments, the length of flipped gate transistor M1 and the length of transistor M2 are substantially equal, so the size difference is determined based on a difference between the width of flipped gate transistor M1 and the width of transistor M2. For example, in some embodiments, flipped gate transistor M1 has a width W1 and a length L giving the flipped gate transistor a size of W1/L; and transistor M2 has a width W2 and a length L giving the transistor a size of W2/L, so a ratio of the size of transistor M2 to the size of flipped gate transistor M1 is given by W2/W1. In some embodiments, a ratio of W2/W1 ranges from about 2 to about 50. In some embodiments, the size difference between transistor M2 and flipped gate transistor M1 is adjusted by altering a number of fingers in transistor M2 or flipped gate transistor M1. For example, in some embodiments, transistor M2 has 2 times to 50 times more fingers than flipped gate transistor M1. When a size of flipped gate transistor M1 is equal to a size of transistor M2 and a current across both flipped gate transistor M1 and transistor M2 is equal tracking voltage $V_{TRK}$ has a negative variation with temperature, in some embodiments. Adjusting the relative size of flipped gate transistor M1 with respect to transistor M2 alters how tracking voltage $V_{TRK}$ varies with respect to temperature. Temperature dependency of tracking voltage $V_{TRK}$ is also dependent on a current density of transistor M2 relative to a current density of flipped gate transistor M1. Proper sizing of transistor M2 relative to flipped gate transistor M1 or setting of a current density through transistor M2 relative to flipped gate transistor M1 results in a temperature dependency of tracking voltage $V_{TRK}$ which substantially matches the temperature dependency of control resistor R11.

First current source 112 is configured to provide the first current to flipped gate transistor M1. Second current source 114 is configured to provide the second current to transistor M2. A least common denominator current ($I_{LCD}$) is defined based on a ratio of the first current to the second current. For example, a ratio of the first current to the second current being 11:2 results in a least common denominator current of 1. A ratio of the first current to the second current being 8:4 results in a least common denominator current of 4. The first current is a first integer multiple (K1) of the $I_{LCD}$. The second current is also a second integer multiple (K2) of the $I_{LCD}$. The first integer multiple K1 is greater than the second integer multiple K2. In some embodiments, the first integer multiple K1 is about two times greater than the second integer multiple K2. In some embodiments, the first integer multiple K1 is more than two times greater than the second integer multiple K2.

The integer multiple N is determined at least in part by first integer multiple K1 and second integer multiple K2. Tuning of integer multiple N enables adjustment of temperature dependency of tracking voltage $V_{TRK}$. Tuning the integer multiple N, such that the $\Delta V_{gs}$ of flipped gate transistor M1 and transistor M2 is approximately equal to the bandgap voltage of a semiconductor-based material used in production process used to form tracking voltage generator 110, results in decreased temperature dependency of tracking voltage $V_{TRK}$. In some embodiments, where control resistor R11 has a temperature independent resistance, the $\Delta V_{gs}$ of flipped gate transistor M1 and transistor M2 is set as approximately equal to the bandgap voltage of a semiconductor-based material to generate a temperature independent tracking voltage $V_{TRK}$.

Transistor M3 is used to remove a channel leakage component of a drain source current running through transistor M2. A size of transistor M3 is equal to a size of transistor M2. Any leakage current through transistor M2 is directed to transistor M3 to help maintain the second current I2 for the purpose of temperature compensation of the tracking voltage $V_{TRK}$. The addition of transistor M3 to compensate for leakage through transistor M2 helps to use an entirety of the second current I2 for the purpose of temperature compensation for tracking voltage $V_{TRK}$. This leakage cancellation is most effective when the drain-source voltage of M2 is equal to the drain-source voltage of M3, which happens when operating voltage VDD is set at a value given by $2 V_{TRK}$. In approaches that do not include transistor M3, accuracy of the tracking voltage generator rapidly degrades at temperatures above 80° C.

Amplifier 120 is configured to receive tracking voltage $V_{TRK}$ at the first input and to receive a feedback voltage $V_{FB}$ at the second input. The output of amplifier 120 is connected to the gate of control transistor M11 to adjust conductivity of the control transistor. Amplifier 120 in combination with control transistor M11 is configured to maintain tracking voltage $V_{TRK}$ substantially equal to feedback voltage $V_{FB}$. By maintaining tracking voltage $V_{TRK}$ substantially equal to feedback voltage $V_{FB}$, a reference current Iref across control resistor R11 remains constant due to the constant ratio of $V_{TRK}/r11$ for a wide range of temperatures.

The source of control transistor M11 is connected in series with control resistor R11. A drain of control transistor M11 is connected to current mirror 130. In some embodiments, control transistor M11 is an NMOS transistor.

Control resistor R11 is connected between control transistor M11 and negative supply voltage VSS. In some embodiments, control resistor R11 has a temperature independent resistance. In some embodiments where the resistance of control resistor R11 is temperature independent, the control resistor includes the use of silicon chromium (SiCr) resistors.

In some embodiments, control resistor R11 has a negative temperature coefficient (TC) meaning that the resistance of the control resistor decreases as temperature increases. In some embodiments where control resistor R11 has a negative TC, the resistance of the control resistor varies less than about 10% over an operating temperature range of current reference 100. The resistance variation of less than about 10% causes a size difference between transistor M2 and flipped gate transistor M1 to be lower than the size difference used for higher variations in resistance. For example, in some embodiments where control resistor R11 has a negative TC, a ratio n2/n1 ranges from about 1.0 to about 8.0, where n2 is a size of transistor M2 and n1 is a size of flipped gate transistor M1.

In some embodiments where control resistor R11 has a negative TC, the control resistor includes p-doped polysilicon. In some embodiments where control resistor R11 has a negative TC, the control resistor is free of a silicide layer. A p-doped polysilicon control resistor R11, which is free of a silicide layer, has a resistance temperature variation of less than 5% over the operating temperature range of current reference 100, in some embodiments.

In some embodiments, control resistor R11 has a positive TC meaning that the resistance of the control resistor increases as temperature increases. In some embodiments where control resistor R11 has a positive TC, the resistance of the control resistor varies less than about 10% over an operating temperature range of current reference 100. In comparison with a negative TC, in some embodiments where control resistor R11 has a positive TC, the size difference between transistor M2 and flipped gate transistor M1 is greater. For example, in some embodiments where control resistor R11 has a positive TC, a ratio n2/n1 ranges from about 8.0 to about 40.0.

In some embodiments, control resistor R11 is trimmed at room temperature during manufacturing in order to reduce lot-to-lot resistance variation within the control resistor. In some embodiments, control resistor R11 is trimmed using a passive trimming process. In some embodiments, control resistor R11 is trimmed using an active trimming process. In some embodiments, control resistor R11 is trimmed using a laser trimming process. The trimming process helps to maintain a high level of control over manufacturing variations. The trimming process increases manufacturing cost and time; however, the trimming process increases a precision of reference current Iref generated by current reference 100.

Figure 3:
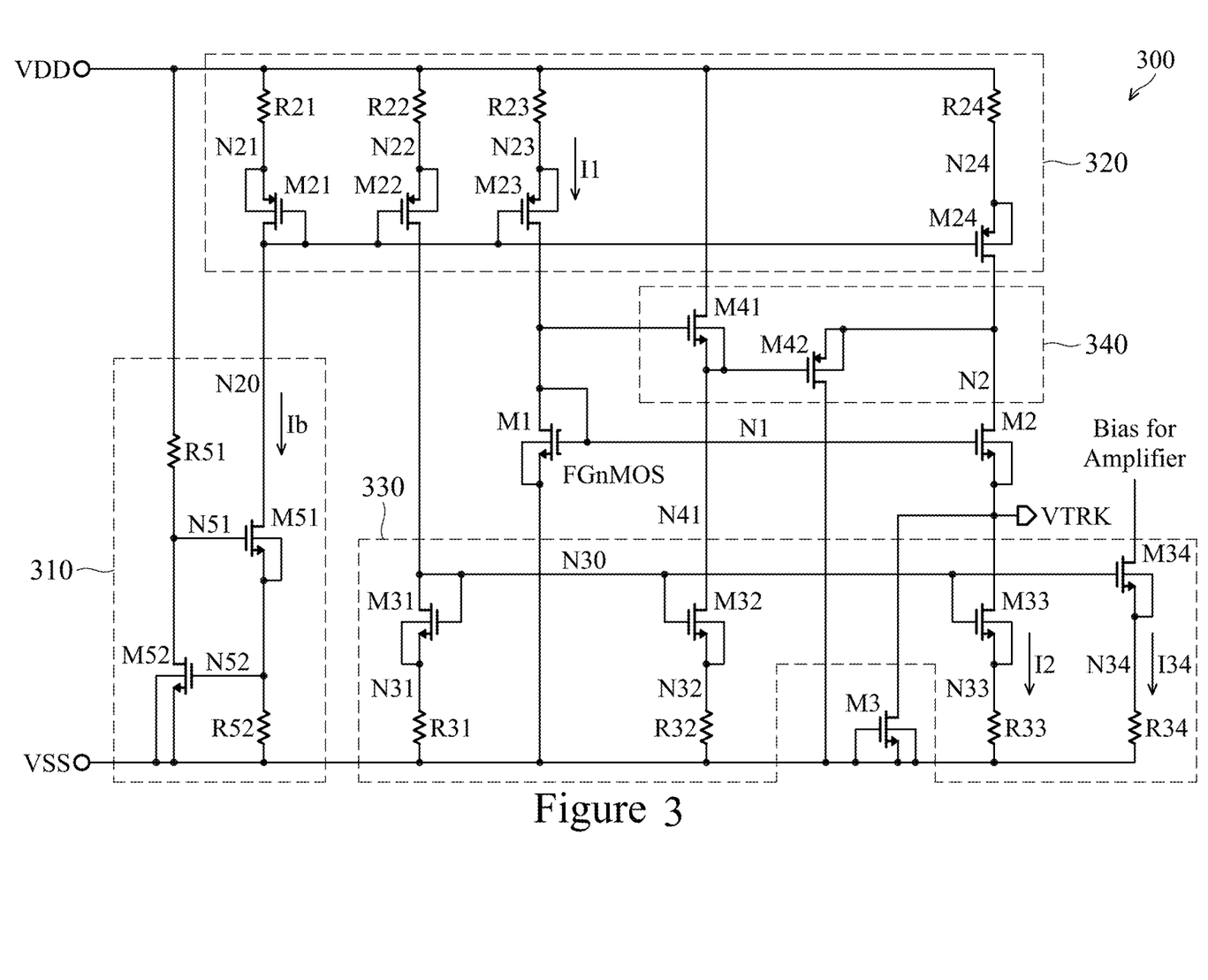
FIG. 3 is a schematic diagram of a tracking voltage generator in accordance with some embodiments.

FIG. 3 is a schematic diagram of a tracking voltage generator 300 in accordance with one or more embodiments. Tracking voltage generator 300 includes flipped gate transistor M1, transistor M2 and transistor M3 similar to tracking voltage generator 100. Tracking voltage generator 300 further includes a startup and bias current generator region 310 configured to receive an input voltage and to generate a bias current. A first current mirror region 320 is configured to generate the first current I1 for flipped gate transistor M1 based on the bias current from startup and bias current generator 310. A second current mirror region 330 is configured to receive a mirrored portion of the first current I1 and generate the second current I2 for transistor M2. A voltage boxing region 340 is configured to maintain a voltage drop across transistor M2 approximately equal to tracking voltage $V_{TRK}$.

In some embodiments, startup and bias current generator region 310 is omitted. In some embodiments where startup and bias current generator region 310 is omitted, tracking voltage generator 300 is configured to receive the bias current from an external current source.

Startup and bias current generator region 310 is configured to receive an operating voltage VDD. Startup and bias current generator 310 is connected between the operating voltage VDD and a negative supply voltage VSS. Startup and bias current generator region 310 is configured to generate the bias current Ib along a first line 352 connected to first current mirror region 320. First current mirror region 320 is configured to receive the operating voltage VDD. A second line 354 connected to first current mirror region 320 is connected in series to second current mirror 330. A third line 356 connected to first current mirror 320 is connected in series to flipped gate transistor M1. A fourth line 358 connected to operating voltage VDD through first current mirror 320 is connected to a first portion of voltage boxing region 340. A fifth line 360 connected to first current mirror 320 is connected in series with transistor M2. A second portion of voltage boxing region 340 is connected to negative supply voltage VSS through second current mirror region 330. In some embodiments, the operating voltage VDD is greater than twice the tracking voltage $V_{TRK}$. In some embodiments, negative supply voltage VSS is equal to 0 V. In some embodiments, negative supply voltage VSS is greater or less than 0 V such that operating voltage VDD is always referenced to negative supply voltage VSS.

Startup and bias current generator region 310 is configured to generate the bias current Ib for use by tracking voltage generator 300. Startup and bias current generator region 310 includes a startup resistor R51 configured to receive operating voltage VDD. A first bias transistor M52 is connected in series with startup resistor R51. A bias resistor R52 is connected in series to a second bias transistor M51. Bias resistor R52 is connected to negative supply voltage VSS. A gate of first bias transistor M52 is connected to a node between second bias transistor M51 and bias resistor R52. A gate of second bias transistor M51 is connected to a node between startup resistor R51 and first bias transistor M52. A source terminal of first bias transistor M52 is connected to negative supply voltage VSS. A drain terminal of second bias transistor M51 is connected in series with first current mirror region 320. In some embodiments, first bias transistor M52 is an NMOS transistor. In some embodiments, second bias transistor M51 is an NMOS transistor. In some embodiments, first bias transistor M52 and second bias transistor M51 are in a weak inversion state. A weak inversion state means a gate-source voltage Vgs of a transistor is below a threshold voltage of the transistor.

Startup resistor R51 is used to provide a direct path from the operating voltage VDD to the gate of second bias transistor M51 in order to begin operation of tracking voltage generator 300. A voltage across bias resistor R52 is at least partially defined based on a gate-source voltage Vgs of first bias transistor M52. The Vgs of first bias transistor M52 is defined at least in part by a voltage utilized to conduct the startup current across startup resistor R51. The startup current of tracking voltage generator 300 is provided by the equation VDD−V(N51)/r51, where VDD is the operating voltage, r51 is a corresponding resistance of startup resistor R51, and V(N51) is given by a sum of a gate-source voltage Vgs of first bias transistor M52 and a gate-source voltage Vgs of second bias transistor M51. The bias current Ib is conducted across second bias transistor M51 along the first line 352 to current mirror region 320 and is given by the equation V(N52)/r52, where V(N52) is gate-source voltage Vgs of first bias transistor M52 and r52 is a corresponding resistance of bias resistor R52.

First current mirror region 320 is used to provide an integer-ratio multiple of the bias current Ib to flipped gate transistor M1. First current mirror region 320 includes a first mirror transistor M21 connected in series with a first mirror resistor R21. First mirror resistor R21 is connected to the operating voltage VDD. First mirror transistor M21 is diode-connected. A drain terminal of first mirror transistor M21 is connected to second bias transistor M51 along the first line 352. A second mirror transistor M22 is connected in series with a second mirror resistor R22. Second mirror resistor R22 is connected to the operating voltage VDD. A gate of second mirror transistor M22 is connected to a gate of first mirror transistor M21. A drain terminal of second mirror transistor M22 is connected to second current mirror region 330 along the second line 354. A third mirror transistor M23 is connected in series with a third mirror resistor R23. Third mirror resistor R23 is connected to the operating voltage VDD. A gate of third mirror transistor is connected to the gate of first mirror transistor M21. A drain terminal of third mirror transistor M23 is connected to flipped gate transistor M1 along the third line 356. A fourth mirror transistor M24 is connected in series with a fourth mirror resistor R24. Fourth mirror resistor R24 is connected to the operating voltage VDD. A gate of fourth mirror transistor M24 is connected to the gate of first mirror transistor M21. A drain terminal of fourth mirror transistor M24 is connected to voltage boxing region 340 along the fifth line 360. The drain terminal of fourth mirror transistor M24 is also connected to transistor M2 along the fifth line 360. In some embodiments, each of first mirror transistor M21, second mirror transistor M22, third mirror transistor M23 and fourth mirror transistor M24 are PMOS transistors.

First current mirror region 320 is configured to receive the bias current Ib from startup and bias current generator region 310 along the first line 352 and mirror the bias current Ib along the second line 354, the third line 356 and the fifth line 360. A size of first mirror transistor M21 is defined as an integer multiple of a first transistor unit size for the first mirror transistor, second mirror transistor M22, third mirror transistor M23 and fourth mirror transistor M24. Second mirror transistor M22, third mirror transistor M23 and fourth mirror transistor M24 independently have a size which is an integer multiple of the first transistor unit size.

A resistance of first mirror resistor R21 is defined based on the bias current Ib conducted across first mirror transistor M21 such that the voltage drop across the terminals of R21 is greater than 150 mV. Second mirror resistor R22, third mirror resistor R23 and fourth mirror resistor R24 independently have a resistance which is based on the integer-ratio multiples of the first transistor unit size. By using the first transistor unit size, a current mirrored across each of the mirror transistors of first current mirror region is a ratio of the integer multiples of the relative sizes of the transistors multiplied by a current Ib across the first mirror transistor. A current I22 across second mirror transistor M22 is given by (n22/n21)×Ib, where n22 is an integer multiple of the first transistor unit size for second mirror transistor M22, n21 is an integer multiple of the first transistor unit size for first mirror transistor M21, and Ib is the current across the first mirror transistor. A current I1 across third mirror transistor M23 is given by (n23/n21)×Ib, where n23 is an integer multiple of the first transistor unit size for third mirror transistor M23. A current I24 across fourth mirror transistor M24 is given by (n24/n21)×Ib, wherein n24 is an integer multiple of the first transistor unit size for fourth mirror transistor M24.

By using the first transistor unit size, a resistance across each of the mirror resistors of first current mirror region is a ratio of the integer multiples of the relative sizes of the transistors multiplied by a resistance r21 corresponding to first mirror resistor R21. A resistance r22 corresponding to second mirror resistor R22 is given by (n21/n22)×r21, where n22 is an integer multiple of the first transistor unit size for second mirror transistor M22, n21 is an integer multiple of the first transistor unit size for first mirror transistor M21, and r21 is the resistance corresponding to the first mirror resistor. A resistance r23 corresponding to third mirror resistor R23 is given by (n21/n23)×r21, where n23 is an integer multiple of the first transistor unit size for third mirror transistor M23. A resistance r24 corresponding to fourth mirror resistor R24 is given by (n21/n24)×r21, wherein n24 is an integer multiple of the first transistor unit size for fourth mirror transistor M24.

Adjusting sizes of the mirror transistors M21-M24 and the mirror resistor R21-R24 of first current mirror region 320 enables tuning of the current across flipped gate transistor M1, e.g., first current I1 (FIG. 1), as well as along the other lines of the first current mirror. For example, third mirror transistor M23 and third mirror resistor R23 determine the current across flipped gate transistor M1. In another example, second mirror transistor M22 and second mirror resistor R22 determine the current supplied to second mirror region 330. In an additional example, fourth mirror transistor M24 and fourth mirror resistor R24 determine the current across transistor M2 and across second portion of voltage boxing region 340. Tuning of the current across flipped gate transistor M1 helps to increase accuracy and control temperature dependency of tracking voltage $V_{TRK}$ output by tracking voltage generator 300. The mirror transistors M21-M24 of first current mirror region 320 are capable of accurately mirroring currents at nano-amp current levels.

Second current mirror region 330 is configured to mirror a current from first current mirror region 320. Second current mirror region 330 includes fifth mirror transistor M31 connected in series with fifth mirror resistor R31. Fifth mirror resistor R31 is connected to negative supply voltage VSS. Fifth mirror transistor M31 is diode-connected. A drain terminal of fifth mirror transistor M31 is connected to second mirror transistor M22 along the second line 354. Second current mirror region 230 further includes a sixth mirror transistor M32 connected in series with a sixth mirror resistor R32. Sixth mirror resistor R32 is connected to negative supply voltage VSS. A gate of sixth mirror transistor M32 is connected to a gate of fifth mirror transistor M31. A drain terminal of sixth mirror transistor M32 is connected to voltage boxing region 340 along the fourth line 358. Second current mirror region 230 further includes a seventh mirror transistor M33 connected in series with a seventh mirror resistor R33. Seventh mirror resistor R33 is connected to negative supply voltage VSS. A gate of seventh mirror transistor M33 is connected to a gate of fifth mirror transistor M31 and the gate of sixth mirror transistor M32. A drain terminal of seventh mirror transistor M33 is connected to transistor M2 and to transistor M3 along the fifth line 360. Second current mirror region 230 further includes an eighth mirror transistor M34 connected in series with an eighth mirror resistor R34. Eighth mirror resistor R34 is connected to negative supply voltage VSS. A gate of eighth mirror transistor M34 is connected to the gate of fifth mirror transistor M31. A drain terminal of eighth mirror transistor M34 provides bias current I34 to amplifier 120 (FIG. 1). In some embodiments, each of fifth mirror transistor M31, sixth mirror transistor M32, seventh mirror transistor M33, and eighth transistor M34 are NMOS transistors.

Second current mirror region 330 is configured to receive current I22 from first current mirror region 320 along the second line 354 and mirror current I22 along the fourth line 358 and along the fifth line 360. A size of fifth mirror transistor M31 is defined as an integer multiple of a second transistor unit size. Sixth mirror transistor M32 has a size which is an integer multiple of the second transistor unit size. Seventh mirror transistor M33 also has a size which is an integer multiple of the second transistor unit size. Eighth mirror transistor M34 also has a size which is an integer multiple of the second transistor unit size. In some embodiments, the first transistor unit size is equal to the second transistor unit size. In some embodiments, the first transistor unit size is different from the second transistor unit size.

A resistance of fifth mirror resistor R31 is defined based on the current conducted across fifth mirror transistor M31 such that the voltage drop across the terminals of R31 is greater than 150 mV. Sixth mirror resistor R32 has a resistance which is based on the integer multiples of the second transistor unit size. Seventh mirror resistor R33 also has a resistance which is based on the integer multiples of the second transistor unit size. Eighth mirror resistor R34 also has a resistance which is based on the integer multiples of the second transistor unit size.

By using the second transistor unit size, a current mirrored across each of the mirror transistors of second current mirror region 330 is a ratio of the integer multiples of the relative sizes of the transistors multiplied by a current I22 across fifth mirror transistor M31. A current I2 across sixth mirror transistor M32 is given by (n32/n31)×I22, where n32 is an integer multiple of the second transistor unit size for sixth mirror transistor M32, n31 is an integer multiple of the second transistor unit size for fifth mirror transistor M31, and I22 is the current across the fifth mirror transistor M31. A current I33 across seventh mirror transistor M33 is given by (n33/n31)×I22, where n33 is an integer multiple of the second transistor unit size for seventh mirror transistor M33. A current I34 across eighth mirror transistor M34 is given by (n34/n31)×I22, where n34 is an integer multiple of the second transistor unit size for eighth mirror transistor M34.

By using the second transistor unit size, a resistance across each of the mirror resistors of second current mirror region 330 is a ratio of the integer multiples of the relative sizes of the transistors multiplied by a resistance r31 corresponding to fifth mirror resistor R31. A resistance r32 corresponding to sixth mirror resistor R32 is given by (n31/n32)×r31, where n32 is an integer multiple of the second transistor unit size for sixth mirror transistor M32, n31 is an integer multiple of the second transistor unit size for fifth mirror transistor M31, and r31 is the resistance corresponding to the fifth mirror resistor. A resistance r33 corresponding to seventh mirror resistor R33 is given by (n31/n33)×r31, where n33 is an integer multiple of the second transistor unit size for seventh mirror transistor M33. A resistance r34 corresponding to eighth mirror resistor R34 is given by (n31/n34)×r31, where n34 is an integer multiple of the second transistor unit size for eighth mirror transistor M34.

Adjusting sizes of the mirror transistors M31-M34 as well as the mirror resistors R31-R34 of second current mirror region 330 enables tuning of the current across transistor M2, e.g., second current I2 (FIG. 1), and tuning of a bias supplied to amplifier 120. For example, sixth mirror transistor M32 and sixth mirror resistor R32 determine the current I32 across a first portion of voltage boxing region 340. In another example, seventh mirror transistor M33 and seventh mirror resistor R33 determine the current I2 across transistor M2. Tuning of the current across transistor M2 helps to increase accuracy and control temperature dependency of tracking voltage $V_{TRK}$ output by tracking voltage generator 300. In still another example, eighth mirror transistor M34 and eighth mirror resistor R34 determine the current I34 configured to bias amplifier 120. The mirror transistors M31-M34 of second current mirror region 330 are capable of accurately mirroring currents at nano-amp current levels.

Voltage boxing region 340 is configured to maintain a voltage drop across transistor M2 approximately equal to tracking voltage $V_{TRK}$. Voltage boxing region 340 includes a first boxing transistor M41. A source terminal of first boxing transistor M41 is connected to sixth mirror transistor M32 along the fourth line 358. A gate of first boxing transistor M41 is connected to the drain terminal of flipped gate transistor M1 and is configured to receive current I1. A drain terminal of first boxing transistor M41 is connected to the operating voltage VDD. In some embodiments, first boxing transistor M41 is an NMOS transistor. Voltage boxing region 340 further includes a second boxing transistor M42. A source terminal of second boxing transistor M42 is connected to the drain terminal of transistor M2 along the fifth line 360. A drain terminal of second boxing transistor M42 is connected to the negative supply voltage VSS. A gate of second boxing transistor M42 is connected to a source terminal of first boxing transistor M41 and is configured to receive current I32. In some embodiments, second boxing transistor M42 is a PMOS transistor.

First boxing transistor M41 is a level-shifting source follower. First boxing transistor is biased by current I32 from second current mirror region 330. First boxing transistor M41 is configured to perform level-shifting in a direction of the negative supply voltage VSS. Second boxing transistor M42 is also a level-shifting source follower. Second boxing transistor M42 is biased by a difference between a current I24 across fourth mirror transistor M24 and current I2 across transistor M2. Current I2 across transistor M2 is less than current I24 across fourth mirror transistor M24. Second boxing transistor M42 is configured to perform level-shifting in a direction of the operating voltage VDD.

First boxing transistor M41 has a size larger than a size of second boxing transistor M42. A level-shift from the gate of first boxing transistor M41 to the source terminal of second boxing transistor M42 is a positive value, due to the size difference between the first boxing transistor and the second boxing transistor as well as the current difference between current I32 and the (I24-I2) current across second boxing transistor M42. The positive value of the level-shifting to the source terminal of second boxing transistor M42 helps to provide a voltage level at the source terminal of the second boxing transistor suitable to approximately match a leakage current of transistor M2 to a leakage current of transistor M3. By matching the leakage current of transistor M2 to the leakage current of M3, tracking voltage $V_{TRK}$ output by tracking voltage generator 300 is maintained at a consistent temperature variation level. In some embodiments, a voltage level at the source terminal of second boxing transistor M42 is approximately equal to twice (2 $V_{TRK}$) the tracking voltage $V_{TRK}$.

In comparison with other boxing regions, voltage boxing region 340 uses negative level-shifting by first boxing transistor M41 followed by positive level-shifting by second boxing transistor M42 in order to reduce head-room penalty for tracking voltage generator 300. Head-room penalty is a difference between the minimum required operating voltage VDD and an output voltage of tracking voltage generator 300. By reducing the head-room penalty, applicability of tracking voltage generator 300 increases over a wider operating voltage VDD range. For example, reduced head-room penalty increases compatibility of tracking voltage generator 300 with lithium-ion batteries or other low voltage power supplies.

Figure 4:
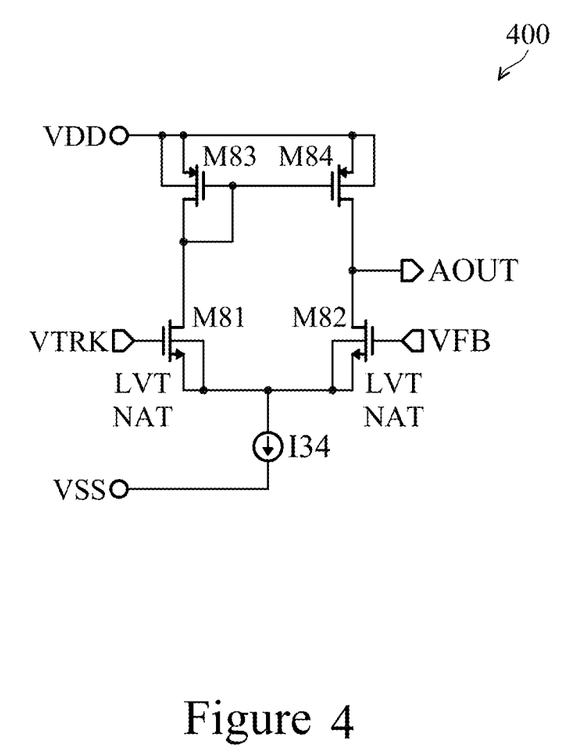
FIG. 4 is a schematic diagram of an amplifier in accordance with some embodiments.

FIG. 4 is a schematic diagram of an amplifier 400 in accordance with some embodiments. Amplifier 400 includes a first amplifier transistor M81 configured to receive tracking voltage $V_{TRK}$. Amplifier 400 further includes a second amplifier transistor M82 configured to receive feedback voltage $V_{FB}$. A third amplifier transistor M83 is connected in series with first amplifier transistor M81 between operating voltage VDD and negative supply voltage VSS. A fourth amplifier transistor M84 is connected in series with second amplifier transistor M82 between operating voltage VDD and negative supply voltage VSS. An output node configured to output an amplified signal to external circuitry is between fourth amplifier transistor M84 and second amplifier transistor M82. In some embodiments, first amplifier transistor M81 and second amplifier transistor M82 are NMOS transistors. In some embodiments, third amplifier transistor M83 and fourth amplifier transistor M84 are PMOS transistors.

Amplifier 400 is configured to receive the tracking voltage $V_{TRK}$ and the feedback voltage $V_{FB}$ and to output an amplified signal to external circuitry, e.g., control transistor M11 (FIG. 1). In a current reference, e.g., current reference 100, amplifier 400 is configured to maintain the tracking voltage $V_{TRK}$ to be substantially equal to the feedback voltage $V_{FB}$.

First amplifier transistor M81 is configured to receive the tracking voltage $V_{TRK}$ at a gate. A source of first amplifier transistor M81 is connected to a current source. In some embodiments, the current source is part of a current mirror region of a tracking voltage generator, e.g., eighth mirror transistor M34 (FIG. 3). A drain of first amplifier transistor M81 is connected to third amplifier transistor M83.

Second amplifier transistor M82 is configured to receive the feedback voltage $V_{FB}$ at a gate. A source of second amplifier transistor M82 is connected to the current source. In some embodiments, the current source is part of a current mirror region of a tracking voltage generator, e.g., eighth mirror transistor M34 (FIG. 3). A drain of second amplifier transistor M82 is connected to the output node and to fourth amplifier transistor M84.

Third amplifier transistor M83 is a diode-connected transistor. A source of third amplifier transistor M83 is connected to operating voltage VDD. A drain of third amplifier transistor M83 is connected to first amplifier transistor M81. A gate of third amplifier transistor M83 is connected to a gate of fourth amplifier transistor M84.

A source of fourth amplifier transistor M84 is connected to operating voltage VDD. A drain of fourth amplifier transistor M84 is connected to the output node and to second amplifier transistor M82.

Figure 5:
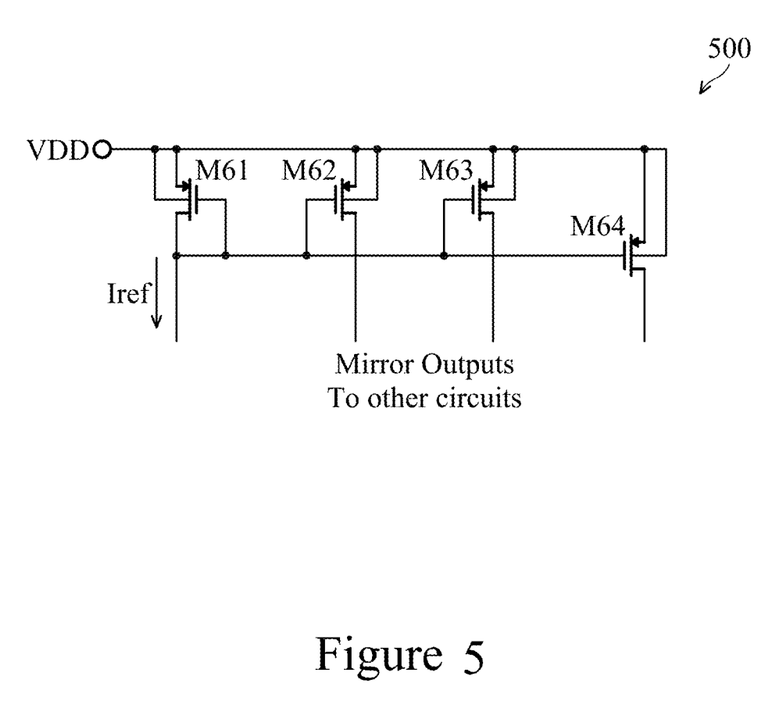
FIG. 5 is a schematic diagram of a current mirror in accordance with some embodiments.

FIG. 5 is a schematic diagram of a current mirror 500 in accordance with some embodiments. Current mirror 500 is used to provide an integer-ratio multiple of the reference current Iref to external circuitry. Current mirror 500 includes a first mirroring transistor M61 connected to operating voltage VDD. First mirroring transistor M61 is diode-connected. A drain terminal of first mirroring transistor M61 is connected to the reference current Iref. A second mirroring transistor M62 is connected to the operating voltage VDD. A gate of second mirroring transistor M62 is connected to a gate of first mirroring transistor M61. A drain terminal of second mirroring transistor M62 is connected to external circuitry. A third mirroring transistor M63 is connected to the operating voltage VDD. A gate of third mirroring transistor M63 is connected to the gate of first mirroring transistor M61. A drain terminal of third mirroring transistor M23 is connected to external circuitry. A fourth mirroring transistor M64 is connected to the operating voltage VDD. A gate of fourth mirroring transistor M64 is connected to the gate of first mirroring transistor M61. A drain terminal of fourth mirroring transistor M64 is connected to external circuitry. In some embodiments, each of first mirroring transistor M61, second mirroring transistor M62, third mirroring transistor M63 and fourth mirroring transistor M64 are PMOS transistors. In some embodiments, a number of mirroring transistors in current mirror 500 is greater than or less than four.

Current mirror 500 is configured to receive the reference current Iref, e.g., from control transistor M11 (FIG. 1). A size of first mirroring transistor M61 is defined as an integer multiple of a third transistor unit size for the first mirroring transistor, second mirroring transistor M62, third mirroring transistor M63 and fourth mirroring transistor M64. Second mirroring transistor M62, third mirroring transistor M63 and fourth mirroring transistor M64 independently have a size which is an integer multiple of the third transistor unit size. In some embodiments, the third transistor unit size is equal to at least one of the first transistor unit size or the second transistor unit size. In some embodiments, the third transistor unit size is different from both the first transistor unit size and the second transistor unit size.

By using the third transistor unit size, a current mirrored across each of the mirroring transistors of current mirror 500 is a ratio of the integer multiples of the relative sizes of the transistors multiplied by the reference current Iref across first mirroring transistor M61. A current I62 across second mirroring transistor M62 is given by (n62/n61)×Iref, where n62 is an integer multiple of the third transistor unit size for second mirroring transistor M62, n61 is an integer multiple of the third transistor unit size for first mirroring transistor M61, and Iref is the reference current across the first mirroring transistor. A current I63 across third mirroring transistor M63 is given by (n63/n61)×Iref, where n63 is an integer multiple of the third transistor unit size for third mirroring transistor M63. A current I64 across fourth mirroring transistor M64 is given by (n64/n61)×Iref, wherein n64 is an integer multiple of the third transistor unit size for fourth mirroring transistor M64.

Adjusting sizes of the mirroring transistors M61-M64 of current mirror 500 enables tuning of the current supplied to the external circuitry. The mirroring transistors M61-M64 of current mirror 500 are capable of accurately mirroring currents at micro-amp current levels.

Figure 6:
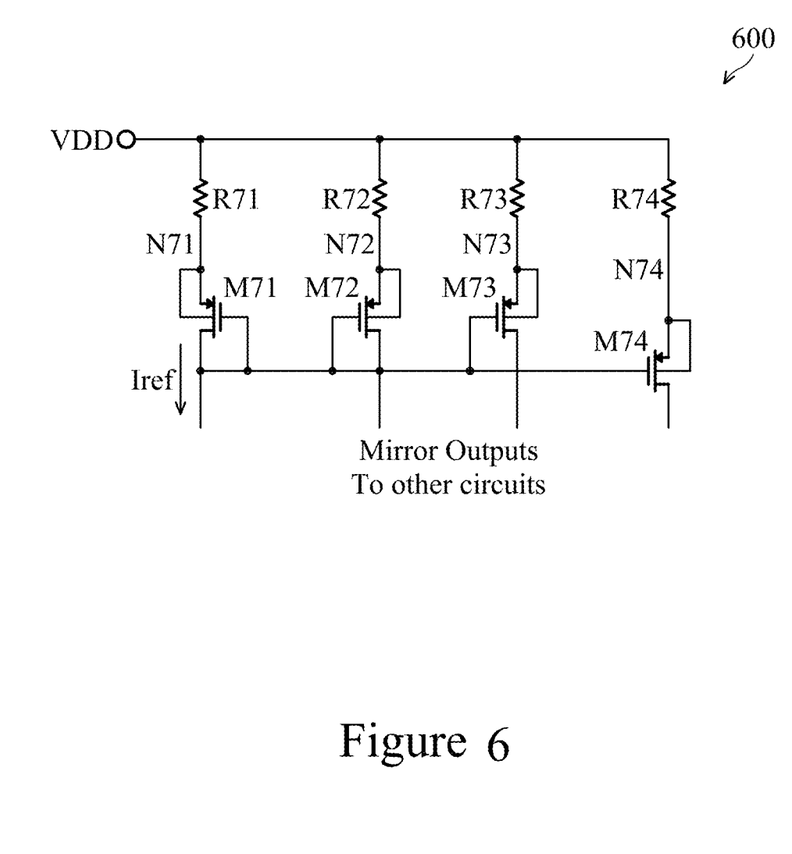
FIG. 6 is a schematic diagram of a current mirror in accordance with some embodiments.

FIG. 6 is a schematic diagram of a current mirror 600 in accordance with some embodiments. Current mirror 600 is similar to current mirror 500 with the addition of mirroring resistors R71-R74 between the operating voltage VDD and a corresponding mirror transistor M71-M74. In some embodiments, a number of mirroring transistors and a number of mirroring resistors are greater than or less than four.

Current mirror 600 is configured to receive the reference current Iref, e.g., from control transistor M11 (FIG. 1). A size of first mirroring transistor M71 is defined as an integer multiple of a fourth transistor unit size for the first mirroring transistor, second mirroring transistor M72, third mirroring transistor M73 and fourth mirroring transistor M74. Second mirroring transistor M72, third mirroring transistor M73 and fourth mirroring transistor M74 independently have a size which is an integer multiple of the fourth transistor unit size. In some embodiments, the fourth transistor unit size is equal to at least one of the first transistor unit size or the second transistor unit size. In some embodiments, the fourth transistor unit size is different from both the first transistor unit size and the second transistor unit size.

A resistance of first mirroring resistor R71 is defined based on the reference current Iref conducted across first mirroring transistor M71 such that the voltage drop across the terminals of R71 is greater than 150 mV. By using the fourth transistor unit size, a resistance across each of the mirroring resistors of current mirror 600 is a ratio of the integer multiples of the relative sizes of the mirroring transistors multiplied by a resistance r71 corresponding to first mirroring resistor R71. A resistance r72 corresponding to second mirroring resistor R72 is given by (n71/n72)×r71, where n72 is an integer multiple of the fourth transistor unit size for second mirroring transistor M72, n71 is an integer multiple of the fourth transistor unit size for first mirroring transistor M71, and r71 is the resistance corresponding to the first mirroring resistor R71. A resistance r73 corresponding to third mirroring resistor R73 is given by (n71/n73)×r71, where n73 is an integer multiple of the fourth transistor unit size for third mirroring transistor M73. A resistance r74 corresponding to fourth mirroring resistor R74 is given by (n71/n74)×r71, wherein n74 is an integer multiple of the fourth transistor unit size for fourth mirroring transistor M74.

Figure 7:
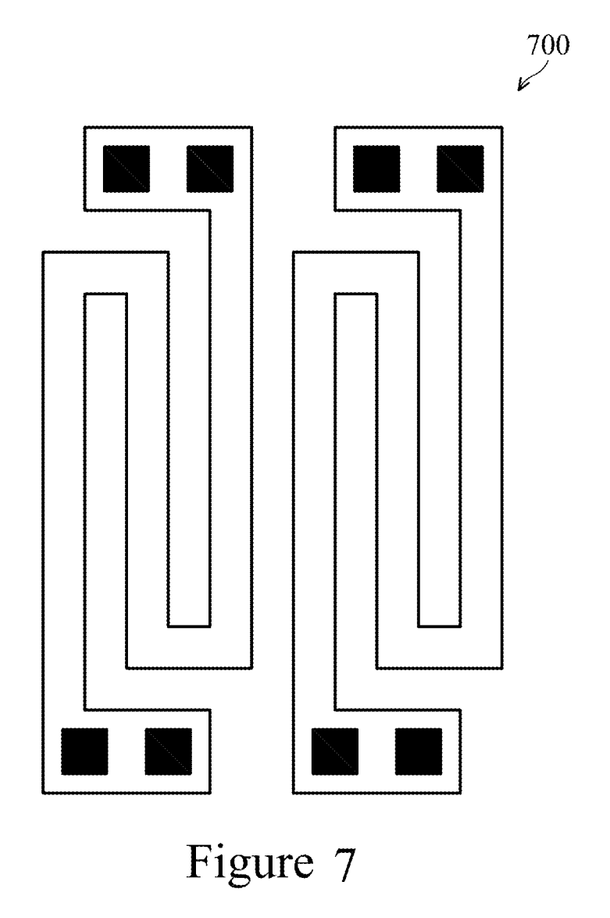
FIG. 7 is a top view of a resistor arrangement in accordance with some embodiments.

FIG. 7 is a top view of a resistor arrangement 700 in accordance with one or more embodiments. Resistor arrangement 700 has a serpentine structure. Resistor arrangement 700 includes polysilicon, thin film silicon chromium or another suitable resistive material. A minimum width of the polysilicon in resistor arrangement 700 is defined by a critical dimension of a formation process. The critical dimension is a smallest dimension which can reliably be formed using the formation process. In some embodiments, resistor arrangement 700 is formed using a lithography process. By including the serpentine structure and width based on the critical dimension, resistor arrangement 700 has a higher resistance per unit area in comparison with other approaches which use wider elements or straight-line layouts. In some embodiments, a resistance of resistor arrangement 700 is on the order of 1 Mega Ohm (MΩ) or greater. In some embodiments, resistor arrangement 700 is used as a resistor unit size for resistors in a tracking voltage generator, e.g., tracking voltage generator 300 (FIG. 3). For example, if resistance r21 corresponding to first mirror resistor R21 is 3 MΩ and the unit resistor size of resistor arrangement 700 is 1 MΩ, the first mirror resistor is formed using three serial connected resistor arrangements, in some embodiments. The voltage drop across resistor arrangement 700 is set at a sufficiently high level to provide current matching in a current mirror, e.g., first current mirror region 320 or second current mirror region 330 (FIG. 3), and to enable the formation of accurate current mirrors at nanopower levels. In some embodiments, a voltage drop across resistor arrangement 700 is equal to or greater than 150 millivolts (mV). In some embodiments, at least one resistor of mirror resistors R21-R24 or R31-R34 is formed having resistor arrangement 400. In some embodiments, all mirror resistors R21-R24 and R31-R34 are formed having resistor arrangement 700. Due to the use of nanopower levels, resistances of resistors in tracking voltage generator 300 are set as high as possible, in some embodiments.

Figure 8:
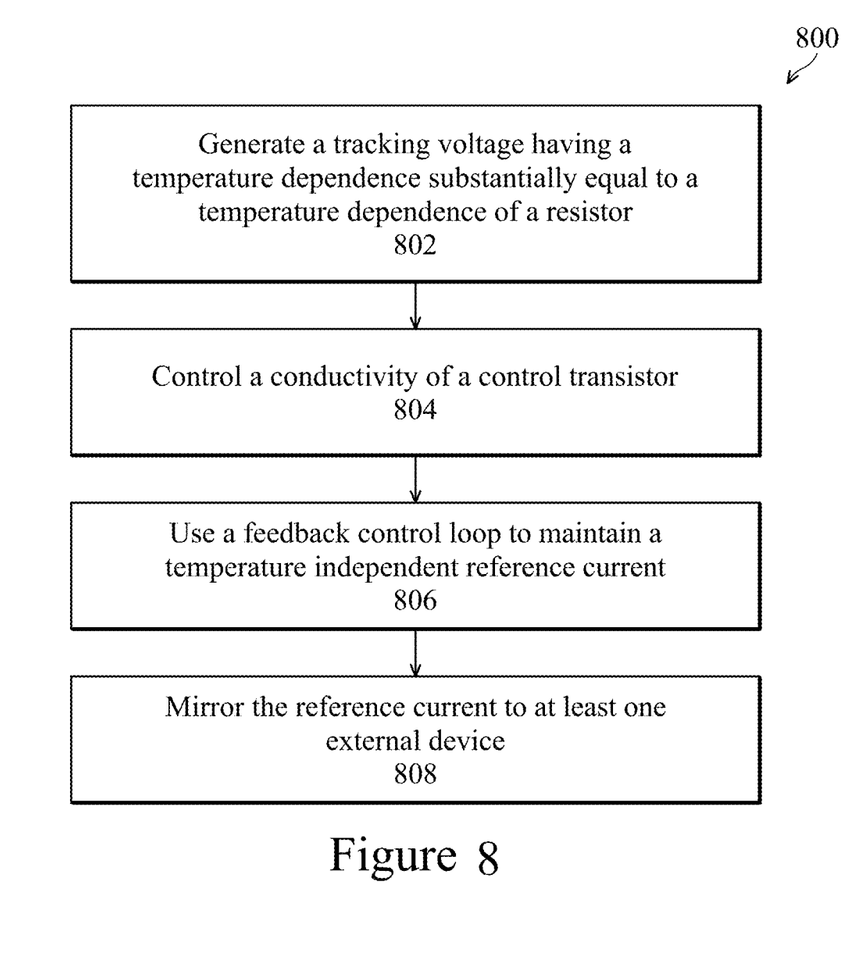
FIG. 8 is a flow chart of a method of using a current reference in accordance with some embodiments.

FIG. 8 is a flowchart of a method 800 of using a current reference in accordance with some embodiments. Method 800 begins with operation 802 in which a tracking voltage is generated. The tracking voltage has a temperature dependence which is substantially equal to a temperature dependence of a resistor of the current reference. In some embodiments, the tracking voltage is temperature independent. In some embodiments, the tracking voltage increases with an increase in temperature. In some embodiments, the tracking voltage decreases with an increase in temperature. In some embodiments, the tracking voltage is generated using a tracking voltage generator, e.g. tracking voltage generator 110 (FIG. 1) or tracking voltage generator 300 (FIG. 3).

In operation 804, a conductivity of a control transistor is controlled. The conductivity of the control transistor, e.g., control transistor M11 (FIG. 1), is controlled based on the tracking voltage. In some embodiments, the conductivity of the control transistor is controlled using an amplifier, e.g., amplifier 120 (FIG. 1) or amplifier 400 (FIG. 4), connected to a gate of the control transistor. The resistor is connected in series with the control transistor. A resistance of the resistor has a same temperature dependency as the temperature dependency of the tracking voltage.

In operation 806, a feedback loop is used to maintain a temperature independent reference current. In some embodiments, the feedback loop includes a feedback voltage applied to an amplifier controlling the control transistor. In some embodiments, the feedback voltage is the voltage at a node between the resistor and the control transistor. In some embodiments, the feedback voltage is used to help maintain a constant ratio between the resistance of the resistor and the tracking voltage.

In operation 808, the reference current is mirrored to at least one external device. In some embodiments, the reference current is mirrored using a current mirror, e.g., current mirror 130 (FIG. 1), current mirror 500 (FIG. 5), or current mirror 600 (FIG. 6). In some embodiments, the reference current is mirrored to a plurality of external devices. In some embodiments, the current mirrored to the at least one external device is a ratio of the reference current.

One of ordinary skill in the art would recognize that additional operations are able to be included in method 800, that operations are able to be omitted, and an order of operations are able to be re-arranged without departing from the scope of this description.

In an embodiment, a current reference includes: a tracking voltage generator, the tracking voltage generator including a flipped gate transistor, a first transistor, the first transistor having a first leakage current, wherein the first transistor is coupled with the flipped gate transistor in an arrangement wherein a difference between a gate-source voltage (Vgs) of the flipped gate transistor and the first transistor is approximately equal to a bandgap voltage of a semiconductor material from which the tracking voltage generator is formed, an output node configured to output a tracking voltage, the tracking voltage having a positive or negative temperature dependency based on the flipped gate transistor and the first transistor, and a second transistor connected to the output node, the second transistor having a second leakage current; an amplifier configured to receive the tracking voltage and to output an amplified signal; a control transistor configured to receive the amplified signal and to conduct a reference current therethrough; and a control resistor connected in series with the control transistor, the current reference thereby being configured so that a temperature dependency of the tracking voltage is substantially equal to a temperature dependency of a resistance of the control resistor, thereby maintaining the reference current at a constant value. In an embodiment, the tracking voltage generator further comprises a boxing region configured to provide a voltage level at a drain terminal of the first transistor to maintain the first leakage current substantially equal to the second leakage current. In an embodiment, the amplifier is further configured to receive a feedback voltage from a node located between the control transistor and the control resistor. In an embodiment, the tracking voltage generator further comprises a current mirror region configured to provide a bias voltage to the amplifier. In an embodiment, the tracking voltage generator further comprises a startup and current generation region configured to generate a bias current, and the current reference is configured to provide an integer-ratio multiple of the bias current to the flipped gate transistor. In an embodiment, the temperature dependency of the tracking voltage is dependent on a relative size of the flipped gate transistor with respect to the first transistor. In an embodiment, the temperature dependency of the tracking voltage is dependent on a current density of the first transistor relative to a current density of the flipped gate transistor.

In an embodiment, a current reference includes: a control resistor; a tracking voltage generator including a first current source configured to supply a first current, a first transistor configured to receive the first current and have a first size and a flipped gate, a second current source and configured to provide a second current, and a second transistor configured to receive the second current and have a second size, wherein the tracking voltage generator is configured to provide, at an output node, a tracking voltage having a first temperature dependency over a temperature range based on a ratio of the second size to the first size, a third transistor coupled between the output node and ground, the third transistor having a grounded gate configuration and further being configured so that a voltage drop across the third transistor is substantially similar to a voltage drop across the second transistor which compensates for an effect on the tracking voltage; and an amplifier circuit configured to receive the tracking voltage and maintain a first voltage at a first terminal of the control resistor, the first voltage being substantially equal to the tracking voltage; and wherein the current reference thereby is configured to maintain a reference current through the control resistor at a constant value over the temperature range. In an embodiment, the first temperature dependency of the tracking voltage is dependent on a relative size of the second transistor with respect to the first transistor. In an embodiment, the first transistor has a first leakage current; the second transistor has a second leakage current; and the tracking voltage generator further comprises a boxing region configured to provide a second voltage at a drain terminal of the first transistor, the second voltage having a level sufficient to maintain the first leakage current substantially equal to the second leakage current. In an embodiment, the amplifier circuit is further configured to receive a feedback voltage from a node located between a control transistor and the control resistor. In an embodiment, the tracking voltage generator further comprises a current mirror region configured to provide a bias voltage to the amplifier circuit. In an embodiment, the tracking voltage generator further includes: a startup and current generation region configured to generate a first current and provide the first current to the first transistor; and a current mirror region configured to receive a bias current and provide the first current as an integer multiple of the bias current.

In an embodiment, a current reference includes: a control resistor; a tracking voltage generator including a first transistor having a first size and a flipped gate, and a second transistor having a second size, wherein the tracking voltage generator is configured to provide, at an output node, a tracking voltage having a first temperature dependency over a temperature range based on a ratio of the second size to the first size, a boxing circuit configured to reduce a head-room penalty, the head-room penalty being a difference between a source voltage of the current reference and the tracking voltage; and a third transistor coupled between the output node and ground, the third transistor having a grounded gate configuration and further being configured so that a voltage drop across the third transistor is substantially similar to a voltage drop across the second transistor which compensates for an effect on the tracking voltage; and an amplifier circuit configured to receive the tracking voltage and maintain a first voltage at a first terminal of the control resistor, the first voltage being substantially equal to the tracking voltage; and wherein the current reference thereby is configured to maintain a reference current through the control resistor at a constant value over the temperature range. In an embodiment, the first temperature dependency of the tracking voltage is dependent on a relative size of the second transistor with respect to the first transistor. In an embodiment, the first transistor has a first leakage current; the second transistor has a second leakage current; and the tracking voltage generator further comprises a boxing region configured to provide a second voltage at a drain terminal of the first transistor, the second voltage having a level sufficient to maintain the first leakage current substantially equal to the second leakage current. In an embodiment, the amplifier circuit is further configured to receive a feedback voltage from a node located between a control transistor and the control resistor. In an embodiment, the tracking voltage generator further comprises a current mirror region configured to provide a bias voltage to the amplifier circuit. In an embodiment, the boxing circuit includes: a first level-shifter having an output configured to produce a decreasing level-shift of the source voltage; and a second level-shifter having an output configured to produce an increasing level-shift of a voltage level on a control input of the first level-shifter. In an embodiment, the first level-shifter includes an NMOS transistor, a body terminal and source terminal of the NMOS transistor being coupled together; and the second level-shifter includes: an PMOS transistor, a body terminal and a source terminal of the PMOS transistor being coupled together. It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A current reference comprising:
a tracking voltage generator, the tracking voltage generator comprising:
a flipped gate transistor;
   a first transistor, the first transistor having a first leakage current, wherein the first transistor is coupled with the flipped gate transistor in an arrangement wherein a difference between a gate-source voltage (Vgs) of the flipped gate transistor and the first transistor is approximately equal to a bandgap voltage of a semiconductor material from which the tracking voltage generator is formed;
   an output node configured to output a tracking voltage, the tracking voltage having a positive or negative temperature dependency based on the flipped gate transistor and the first transistor; and
   a second transistor connected to the output node, the second transistor having a second leakage current;
an amplifier configured to receive the tracking voltage and to output an amplified signal;
a control transistor configured to receive the amplified signal and to conduct a reference current therethrough; and
a control resistor connected in series with the control transistor,
the current reference thereby being configured so that a temperature dependency of the tracking voltage is substantially equal to a temperature dependency of a resistance of the control resistor, thereby maintaining the reference current at a constant value.

2. The current reference of claim 1, wherein the tracking voltage generator further comprises a boxing region configured to provide a voltage level at a drain terminal of the first transistor to maintain the first leakage current substantially equal to the second leakage current.

3. The current reference of claim 1, wherein the amplifier is further configured to receive a feedback voltage from a node located between the control transistor and the control resistor.

4. The current reference of claim 1, wherein the tracking voltage generator further comprises a current mirror region configured to provide a bias voltage to the amplifier.

5. The current reference of claim 1, wherein:
the tracking voltage generator further comprises a startup and current generation region configured to generate a bias current, and
the current reference is configured to provide an integer-ratio multiple of the bias current to the flipped gate transistor.

6. The current reference of claim 1, wherein the temperature dependency of the tracking voltage is dependent on a relative size of the flipped gate transistor with respect to the first transistor.

7. The current reference of claim 1, wherein the temperature dependency of the tracking voltage is dependent on a current density of the first transistor relative to a current density of the flipped gate transistor.

8. A current reference comprising:
a control resistor;
a tracking voltage generator including:
   a first current source configured to supply a first current;
   a first transistor configured to receive the first current and have a first size and a flipped gate;
   a second current source and configured to provide a second current; and
   a second transistor configured to receive the second current and have a second size;
   wherein the tracking voltage generator is configured to provide, at an output node, a tracking voltage having a first temperature dependency over a temperature range based on a ratio of the second size to the first size;
   a third transistor coupled between the output node and ground, the third transistor having a grounded gate configuration and further being configured so that a voltage drop across the third transistor is substantially similar to a voltage drop across the second transistor which compensates for an effect on the tracking voltage; and
an amplifier circuit configured to receive the tracking voltage and maintain a first voltage at a first terminal of the control resistor, the first voltage being substantially equal to the tracking voltage; and
wherein the current reference thereby is configured to maintain a reference current through the control resistor at a constant value over the temperature range.

9. The current reference of claim 8, wherein the first temperature dependency of the tracking voltage is dependent on a relative size of the second transistor with respect to the first transistor.

10. The current reference of claim 8, wherein:
the first transistor has a first leakage current;
the second transistor has a second leakage current; and
the tracking voltage generator further comprises a boxing region configured to provide a second voltage at a drain terminal of the first transistor, the second voltage having a level sufficient to maintain the first leakage current substantially equal to the second leakage current.

11. The current reference of claim 8, wherein the amplifier circuit is further configured to receive a feedback voltage from a node located between a control transistor and the control resistor.

12. The current reference of claim 8, wherein the tracking voltage generator further comprises a current mirror region configured to provide a bias voltage to the amplifier circuit.

13. The current reference of claim 8, wherein the tracking voltage generator further comprises:
   a startup and current generation region configured to generate the first current and provide the first current to the first transistor; and
   a current mirror region configured to receive a bias current and provide the first current as an integer multiple of the bias current.

14. A current reference comprising:
   a control resistor;
   a tracking voltage generator including:
      a first transistor having a first size and a flipped gate; and
      a second transistor having a second size;
      wherein the tracking voltage generator is configured to provide, at an output node, a tracking voltage having a first temperature dependency over a temperature range based on a ratio of the second size to the first size;
      a boxing circuit configured to reduce a head-room penalty, the head-room penalty being a difference between a source voltage of the current reference and the tracking voltage; and
      a third transistor coupled between the output node and ground, the third transistor having a grounded gate configuration and further being configured so that a voltage drop across the third transistor is substantially similar to a voltage drop across the second transistor which compensates for an effect on the tracking voltage; and
   an amplifier circuit configured to receive the tracking voltage and maintain a first voltage at a first terminal of the control resistor, the first voltage being substantially equal to the tracking voltage; and
   wherein the current reference thereby is configured to maintain a reference current through the control resistor at a constant value over the temperature range.

15. The current reference of claim 14, wherein the first temperature dependency of the tracking voltage is dependent on a relative size of the second transistor with respect to the first transistor.

16. The current reference of claim 14, wherein:
   the first transistor has a first leakage current;
   the second transistor has a second leakage current; and
   the tracking voltage generator further comprises a boxing region configured to provide a second voltage at a drain terminal of the first transistor, the second voltage having a level sufficient to maintain the first leakage current substantially equal to the second leakage current.

17. The current reference of claim 14, wherein the amplifier circuit is further configured to receive a feedback voltage from a node located between a control transistor and the control resistor.

18. The current reference of claim 14, wherein the tracking voltage generator further comprises a current mirror region configured to provide a bias voltage to the amplifier circuit.

19. The current reference of claim 14, wherein the boxing circuit includes:
   a first level-shifter having an output configured to produce a decreasing level-shift of the source voltage; and
   a second level-shifter having an output configured to produce an increasing level-shift of a voltage level on a control input of the first level-shifter.

20. The current reference of claim 19, wherein:
   the first level-shifter includes:
      an NMOS transistor, a body terminal and source terminal of the NMOS transistor being coupled together; and
   the second level-shifter includes:
      a PMOS transistor, a body terminal and a source terminal of the PMOS transistor being coupled together.

* * * * *